US012638094B2

(12) United States Patent
Zhang

(10) Patent No.: US 12,638,094 B2
(45) Date of Patent: May 26, 2026

(54) AUTOMATIC CONTROL WATER VALVE AND AUTOMATIC WATER FEEDER

(71) Applicant: Shenzhen Rongcheng Innovation Technology Co., LTD, Shenzhen (CN)

(72) Inventor: Fangjian Zhang, Shenzhen (CN)

( * ) Notice: Subject to any disclaimer, the term of this patent is extended or adjusted under 35 U.S.C. 154(b) by 0 days.

(21) Appl. No.: 18/777,767

(22) Filed: Jul. 19, 2024

(65) Prior Publication Data

US 2026/0022778 A1     Jan. 22, 2026

(51) Int. Cl.
*F16K 31/24* (2006.01)
*F16K 21/18* (2006.01)

(52) U.S. Cl.
CPC .............. *F16K 21/18* (2013.01); *F16K 31/24* (2013.01)

(58) Field of Classification Search
CPC ........ F16K 21/18; F16K 21/20; F16K 31/385;
F16K 31/24–265; F16K 31/36–3855;
F16K 31/26; F16K 31/365; F16K 7/17;
Y10T 137/7339; Y10T 137/7374; A01K
39/024; A01K 7/04; F02M 5/12
USPC ........ 251/30.03, 30.01, 45, 38, 65; 137/510,
137/315.05, 505.36, 859, 863, 430, 434,
137/445, 448, 453, 454, 412, 417, 413,
137/414, 403
See application file for complete search history.

(56) References Cited

U.S. PATENT DOCUMENTS

| | | | | |
|---|---|---|---|---|
| 703,805 | A | * | 7/1902 | Murray .................... F16K 31/34 137/414 |
| 732,776 | A | * | 7/1903 | Neumeyer .............. F16K 31/26 251/120 |
| 1,519,654 | A | * | 12/1924 | Banta ......................... E03D 3/04 4/408 |
| 2,491,521 | A | * | 12/1949 | Samiran ................... F02M 5/12 137/414 |
| 2,599,498 | A | * | 6/1952 | Suska ..................... F16K 31/18 137/430 |
| 2,623,726 | A | * | 12/1952 | Suska ..................... F16K 1/427 137/271 |
| 2,698,631 | A | * | 1/1955 | Bashark .................. G05D 9/02 137/414 |
| 2,726,674 | A | * | 12/1955 | Davies ................. B64D 37/005 137/414 |
| 2,781,772 | A | * | 2/1957 | Russell .................... G05D 9/02 137/414 |
| 2,833,300 | A | * | 5/1958 | Sirotek ................... F16K 31/26 251/118 |

(Continued)

*Primary Examiner* — Craig J Price
(74) *Attorney, Agent, or Firm* — Nitin Kaushik

(57)     ABSTRACT

An automatic control water valve and an automatic water feeder are provided. The automatic control water valve includes a valve body, a valve core, and a controller. The valve core is located in a valve core chamber of the valve body. The valve core includes a diaphragm component and a reset spring. The diaphragm component is configured to cooperate with an annular inlet to communicate or miscommunicate a waterway between an inlet channel and an outlet channel. The diaphragm component is provided with a pressure boosting hole communicating the inlet channel and the valve core chamber, a bottom of the valve core chamber is provided with a vent hole; the controller includes a float and a sealing component, the sealing component is linked with the float to seal or open the vent hole in rising or falling state of the float.

13 Claims, 9 Drawing Sheets

(56) References Cited

U.S. PATENT DOCUMENTS

| | | | | |
|---|---|---|---|---|
| 2,855,949 | A * | 10/1958 | Kayser | F02M 1/00 251/44 |
| 3,055,386 | A * | 9/1962 | Moore | F16K 21/18 251/28 |
| 3,255,773 | A * | 6/1966 | Mcqueen | F16K 31/34 137/433 |
| 3,385,316 | A * | 5/1968 | Couffer, Jr. | F16K 31/26 137/414 |
| 3,670,771 | A * | 6/1972 | Dewberry | F16K 31/385 251/61.3 |
| 3,763,881 | A * | 10/1973 | Jones | E03D 1/32 137/414 |
| 3,893,475 | A * | 7/1975 | Hudson | F16K 31/34 137/433 |
| 3,917,219 | A * | 11/1975 | Hendrick | F16K 31/365 251/45 |
| 3,955,791 | A * | 5/1976 | Meckstroth | D06F 33/47 251/38 |
| 4,027,693 | A * | 6/1977 | Thompson | F16K 31/34 137/414 |
| 4,248,402 | A * | 2/1981 | Meckstroth | F16K 31/002 251/45 |
| 4,258,746 | A * | 3/1981 | Hudson | F16K 31/34 137/433 |
| 4,299,248 | A * | 11/1981 | Becker | F16K 24/048 137/414 |
| 4,345,619 | A * | 8/1982 | Johnson | E03D 1/32 137/512.15 |
| 4,351,509 | A * | 9/1982 | Stampfli | F16K 31/404 251/38 |
| 4,390,157 | A * | 6/1983 | Meckstroth | F16K 31/402 251/11 |
| 4,561,627 | A * | 12/1985 | Meckstroth | F16K 31/385 251/45 |
| 4,607,615 | A * | 8/1986 | Boals | F24H 9/2007 137/334 |
| 4,725,038 | A * | 2/1988 | Heneker | F16K 31/385 251/25 |
| 4,771,985 | A * | 9/1988 | Gross | F16K 31/3855 251/38 |
| 4,860,990 | A * | 8/1989 | Fukuzawa | F16K 31/404 251/126 |
| 4,881,661 | A * | 11/1989 | Jones | B67D 3/00 222/189.09 |
| 4,977,923 | A * | 12/1990 | Cho | F16K 21/18 137/414 |
| 5,116,257 | A * | 5/1992 | Szlaga | F02M 25/0836 137/589 |
| 5,169,117 | A * | 12/1992 | Huang | F16K 31/086 251/38 |
| 5,180,138 | A * | 1/1993 | Moldenhauer | H01F 7/1607 251/30.05 |
| 5,389,245 | A * | 2/1995 | Jaeger | F16K 24/042 210/167.01 |
| 5,533,545 | A * | 7/1996 | Robinson | F16K 31/088 137/448 |
| 5,595,210 | A * | 1/1997 | Kushiya | F16K 51/00 137/181 |
| 5,611,459 | A * | 3/1997 | Hinch | G01F 23/36 222/67 |
| 5,724,947 | A * | 3/1998 | Takaki | F02M 37/10 137/565.34 |
| 5,758,863 | A * | 6/1998 | Buffet | F16K 31/3855 251/28 |
| 5,960,817 | A * | 10/1999 | Johansen | B60K 15/03519 137/202 |
| 5,979,482 | A * | 11/1999 | Scott | F16K 31/402 137/15.01 |
| 5,996,965 | A * | 12/1999 | Eichholz | F16K 31/402 251/30.05 |
| 6,076,550 | A * | 6/2000 | Hiraishi | H01F 7/1607 251/38 |
| 6,155,288 | A * | 12/2000 | Johnson | B08B 9/00 137/437 |
| 6,164,313 | A * | 12/2000 | Walters | F16K 31/34 137/625.33 |
| 6,254,057 | B1 * | 7/2001 | Pubben | F16K 7/17 137/625.25 |
| 6,311,718 | B1 * | 11/2001 | Hafner | F16K 31/3855 137/907 |
| 6,374,855 | B1 * | 4/2002 | Hansen | F16K 7/17 137/907 |
| 6,408,869 | B1 * | 6/2002 | Bartos | F16K 1/303 137/430 |
| 6,450,196 | B1 * | 9/2002 | Bartos | F16K 31/385 137/430 |
| 7,481,238 | B2 * | 1/2009 | Ramoth | F16K 24/048 137/434 |
| 7,510,166 | B2 * | 3/2009 | Maercovich | E03D 5/10 4/304 |
| 7,647,938 | B2 * | 1/2010 | Jobe | F16K 31/34 137/414 |
| 7,789,066 | B2 * | 9/2010 | Torii | F02M 35/10255 123/336 |
| 8,166,997 | B2 * | 5/2012 | Fukuzawa | E03D 1/32 4/395 |
| 8,499,781 | B2 * | 8/2013 | Jing | F16K 31/38 137/245 |
| 8,555,916 | B2 * | 10/2013 | Ro | F16K 17/34 137/497 |
| 9,637,905 | B2 * | 5/2017 | Hauth | E03C 1/0408 |
| 9,671,038 | B2 * | 6/2017 | Schneidewend | F16K 27/0236 |
| 9,803,656 | B2 * | 10/2017 | Aspen | F04F 5/02 |
| 9,809,963 | B2 * | 11/2017 | Huang | E03D 1/00 |
| 10,125,894 | B2 * | 11/2018 | Ji | E03C 1/10 |
| 10,145,092 | B2 * | 12/2018 | Ji | E03C 1/10 |
| 10,337,641 | B2 * | 7/2019 | Ye | F16K 31/145 |
| 10,458,567 | B2 * | 10/2019 | Buchmueller | F16K 31/383 |
| 10,589,207 | B2 * | 3/2020 | Myung | B01D 46/71 |
| 10,683,946 | B2 * | 6/2020 | Wakeman | F16K 24/048 |
| 10,795,381 | B2 * | 10/2020 | Hashimoto | G05D 7/014 |
| 10,837,571 | B2 * | 11/2020 | Graves | F01P 7/16 |
| 10,982,790 | B2 * | 4/2021 | Lin | F16K 11/161 |
| 11,002,371 | B2 * | 5/2021 | Xia | F16K 17/105 |
| 11,261,992 | B2 * | 3/2022 | Tempel | F16K 27/0236 |
| 11,287,052 | B2 * | 3/2022 | Bian | F16K 31/385 |
| 11,306,844 | B2 * | 4/2022 | Domoto | F16K 31/0655 |
| 11,408,534 | B2 * | 8/2022 | Bian | F16K 31/3855 |
| 11,415,228 | B2 * | 8/2022 | Huang | F16K 31/26 |
| 11,549,596 | B2 * | 1/2023 | Tempel | F16K 27/0236 |
| 11,578,807 | B2 * | 2/2023 | Zhou | E03B 7/075 |
| 11,713,817 | B2 * | 8/2023 | Le | F16K 11/0712 251/324 |
| 11,739,858 | B2 * | 8/2023 | Tempel | F16K 31/52408 251/28 |
| 11,788,641 | B1 * | 10/2023 | Hah | F16K 27/029 251/36 |
| 11,867,313 | B2 * | 1/2024 | Nobili | F16K 31/56 |
| 11,892,094 | B2 * | 2/2024 | Bian | F16K 31/365 |
| 12,228,216 | B2 * | 2/2025 | Sitz | F16K 24/048 |
| 12,366,869 | B2 * | 7/2025 | Pearson | G05D 7/0635 |
| 2008/0010734 | A1 * | 1/2008 | Chang | E03D 5/105 4/405 |
| 2009/0146090 | A1 * | 6/2009 | Hashimoto | G05D 7/03 251/25 |
| 2014/0373934 | A1 * | 12/2014 | Jobe | F16K 31/34 137/430 |
| 2016/0305561 | A1 * | 10/2016 | Ding | B01D 35/1475 |
| 2018/0274686 | A1 * | 9/2018 | Huang | F16K 31/145 |
| 2019/0116744 | A1 * | 4/2019 | Balet | A01G 27/003 |
| 2019/0120403 | A1 * | 4/2019 | Gao | F16K 31/3855 |
| 2024/0295276 | A1 * | 9/2024 | Sitz | F16K 31/08 |

* cited by examiner

AUTOMATIC CONTROL WATER VALVE AND AUTOMATIC WATER FEEDER

TECHNICAL FIELD

The present disclosure relates to the field of automatic control water valve technologies, and in particular, to an automatic control water valve and an automatic water feeder.

BACKGROUND

The automatic control water valves on the current market include mechanical automatic control water valves and electrically controlled automatic control water valves. The electrically controlled automatic control water valves have a complex structure and requires external power supply. Therefore, in most fields, mechanical automatic control water valves are used. The mechanical automatic control water valves are mainly float valves, which control the opening and closing of valves through float valves.

In an application field of a pet water feeder, due to a small volume of the feeding container itself, using a float valve can easily lead to a relatively large volume of an automatic control water valve, and is not easy to disassemble, clean, and repair. Therefore, a small volume and mechanical automatic control water valve is needed.

In view of this, the present application is proposed.

SUMMARY

The present disclosure provides an automatic control water valve and an automatic water feeder to solve at least one of the above-mentioned technical problems.

To solve the above problems, in one aspect of the present disclosure, an automatic control water valve is provided, including a valve body, a valve core, and a controller. The valve body includes an inlet channel, an outlet channel, and a valve core chamber located below the inlet channel and the outlet channel. The outlet channel has an annular inlet with an opening facing the valve core chamber. The valve core is provided in the valve core chamber, the valve core includes a diaphragm component and a reset spring. The diaphragm component is configured to cooperate with the annular inlet to communicate or miscommunicate a waterway between the inlet channel and outlet channel. The diaphragm component is provided with a pressure boosting hole communicating the inlet channel and the valve core chamber, a bottom of the valve core chamber is provided with a vent hole; the controller includes a float and a sealing component, the sealing component is linked with the float to seal or open the vent hole in rising or falling state of the float, the reset spring is configured to lift the diaphragm component to miscommunicate the waterway between the inlet channel and outlet channel after the sealing component seals the vent hole.

In an embodiment of the present disclosure, the scaling component includes a valve clack connection rod and a sealing block; one end of the valve clack connection rod is hinged on the valve body, the other end of the valve clack connection rod abuts against the float to move up and down with the float; the sealing block is provided on the valve clack connection rod and corresponds to the vent hole.

In an embodiment of the present disclosure, the sealing block is provided at a position near a hinge of the valve clack connection rod.

In an embodiment of the present disclosure, the diaphragm component includes a diaphragm silicone and a silicone fastener, the diaphragm silicone is provided on an upper of the silicone fastener, a bottom of the silicone fastener is connected to the reset spring.

In an embodiment of the present disclosure, an outer periphery of the diaphragm silicone is provided with a sealing upper concave ring, which is provided on a top of a side wall of the valve core chamber, an inner side of the sealing upper concave ring is provided with a rebound lower concave ring.

In an embodiment of the present disclosure, the valve body includes an upper shell and a lower shell, the upper shell includes the inlet channel and the outlet channel; the lower shell includes the valve core chamber; the lower shell is detachably or fixedly connected to the upper shell.

In an embodiment of the present disclosure, the automatic control water valve further includes a float bowl, where the float bowl is detachably or fixedly connected to the valve body; the float moves vertically up and down on the float bowl.

In an embodiment of the present disclosure, an automatic water feeder is provided, including a water feeding container, a valve fixing nut, and the automatic control water valve as described above; an outer wall of the inlet channel of the valve body is provided with an external threaded part, a side wall of the water feeding container is provided with an installation through-hole; the valve fixing nut is configured to be threaded fixed with the valve body when one side of the inlet channel of the valve body passes through the installation through-hole.

In an embodiment of the present disclosure, a water filling part of the water feeding container is in a shape of circular basin, rectangular basin, or irregular basin.

In an embodiment of the present disclosure, the water feeding container is provided with a hanging component, the hanging component is configured to hang the water feeding container on a wall or on a bracket.

The present disclosure aims at an application field of pet water feeder, and develops an automatic control water valve. By using a diaphragm component type valve core, the controller is used to control the sealing or opening of the vent hole at the bottom of the valve core chamber, and cooperate with the pressure boosting hole on the diaphragm component to adjust a pressure generated by the valve core chamber on the diaphragm component. After the sealing component seals the vent hole, a water vapor pressure in the inlet channel fills an interior of the valve core chamber through the pressure boosting hole, so that the pressure generated by the valve core chamber on the diaphragm component is balanced with the pressure generated by the water pressure in the inlet channel on the diaphragm component, thereby the diaphragm component is lifted under a rebound force of the reset spring and diaphragm silicone. The diaphragm component cooperates with the annular inlet to miscommunicate the waterway between the inlet channel and the outlet channel. This automatic control water valve has a small size and compact structure; the controller is a mechanical automatic control, which is sensitive to water level height. The valve core has strong rebound sealing ability, it can still maintain a good miscommunication effect when the water pressure fluctuates in a tap water pipe.

Numeral reference: 1. automatic control water valve; 2. valve body; 21. inlet channel; 22. outlet channel; 23. annular inlet; 24. valve core chamber; 241. vent hole; 25. upper shell; 26. lower shell; 261. upper convex circular ring; 27. Screw; 3. diaphragm component; 31. diaphragm silicone; 32. silicone fastener; 33. pressure boosting hole; 4. reset spring; 5. float; 51. vertical guide groove; 6. sealing component; 61. valve clack connection rod; 62. sealing block; 63. pin; 7. float bowl; 71. vertical guide rod; 8. water feeding container; 81. valve fixing nut; 9. tap water pipe.

DESCRIPTION OF EMBODIMENTS

In order to clarify the purpose, technical solution, and advantages of the embodiments of the present disclosure, the following will provide a clear and complete description of the technical solution in the embodiments of the present disclosure in combination with the accompanying drawings. Obviously, the described embodiments are a part of the embodiments of the present disclosure, not all of them. Based on the embodiments of the present disclosure, all other embodiments obtained by those skilled in the art without creative work are within the protection scope of the present disclosure. Therefore, a detailed description of the embodiments of the present disclosure provided in the accompanying drawings is not intended to limit the scope of the present disclosure, but only to represent selected embodiments of the present disclosure. Based on the embodiments of the present disclosure, all other embodiments obtained by those skilled in the art without creative work are within the protection scope of the present disclosure.

In the description of the present disclosure, it should be understood that terms "center", "longitudinal", "transverse", "up", "down", "front", "back", "left", "right", "vertical", "horizontal", "top", "bottom", "inside", "outside", etc. indicate an orientation or position relationship based on the orientation or position relationship shown in the accompanying drawings, only for a convenience of describing the present disclosure and simplifying the description, and do not indicate or imply that the device or element referred to must have a specific orientation, be constructed and operated in a specific orientation, and therefore cannot be understood as a limitation of the present disclosure. In the description of the present disclosure, unless otherwise specified, the meaning of "multiple" refers to two or more.

The specific embodiments of the present disclosure will be described in detail with reference to the accompanying drawings.

Figure 11:
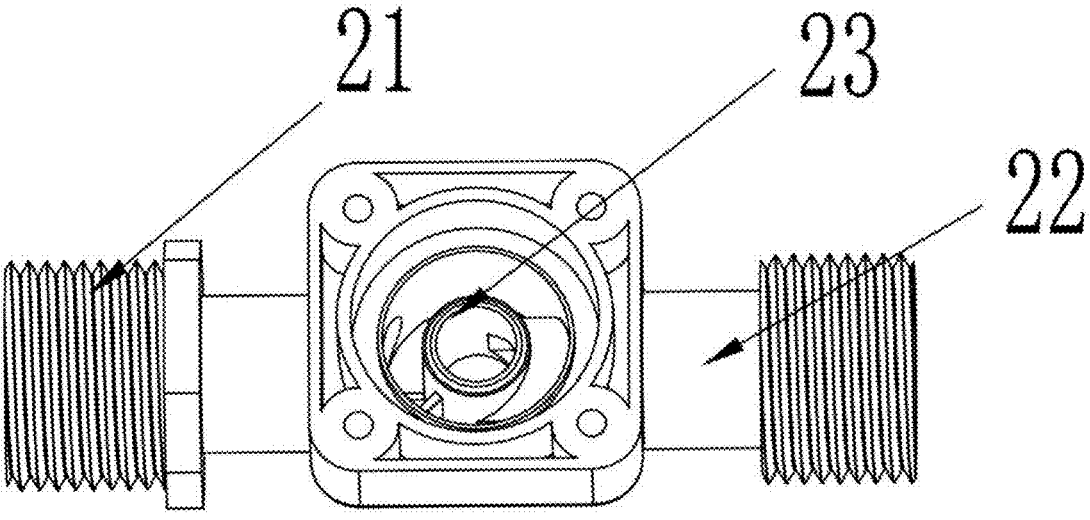
FIG. 11 is a schematic structural diagram of an upper shell of FIG. 1 in the present disclosure.
Figure 12:
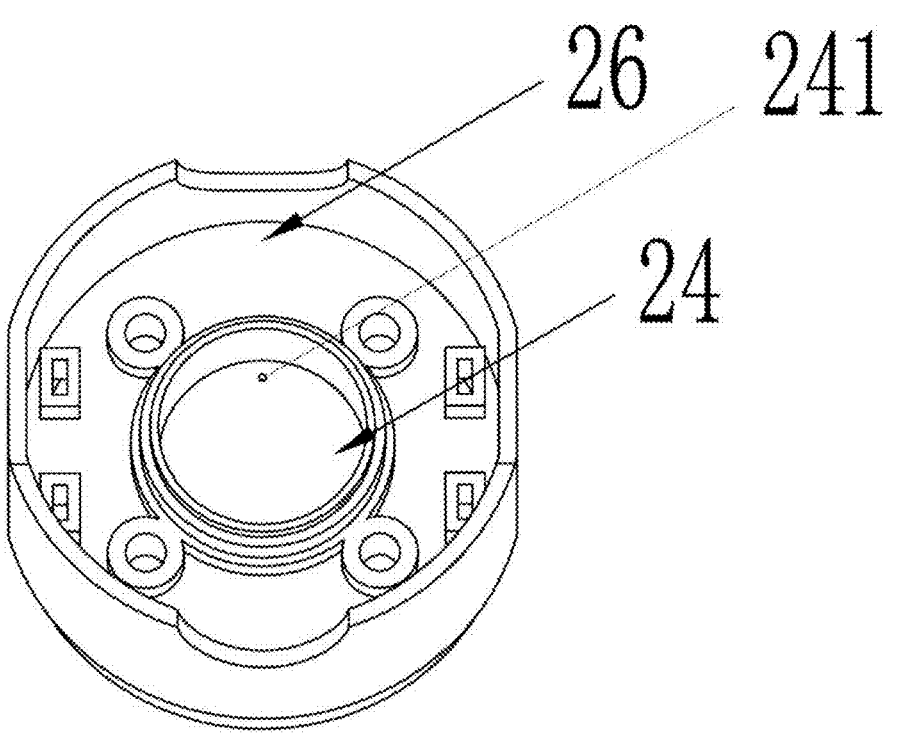
FIG. 12 is a schematic structural diagram of a lower shell of FIG. 1 in the present disclosure.

Please refer to FIGS. 1 to 6, as well as FIGS. 11 and 12, an automatic control water valve 1 is provided, which includes a valve body 2, a valve core, and a controller. The valve body 2 includes an inlet channel 21, an outlet channel 22, and a valve core chamber 24 located below the inlet channel 21 and the outlet channel 22. The outlet channel 22 has an annular inlet 23 with an opening facing the valve core chamber 24.

The valve core is located in the valve core chamber 24, the valve core includes a diaphragm component 3 and a reset spring 4. The annular inlet 23 has a tubular structure, with one end directly communicated to the outlet channel 22 and the other being an opening and facing the valve core chamber 24. The diaphragm component 3 is configured to cooperate with the annular inlet 23 to seal and open a waterway between the valve core chamber 24 and the outlet channel 22, so as to communicate or miscommunicate the waterway between the inlet channel 21 and the outlet channel 22; the annular inlet 23 is located in the inlet channel 21. When the annular inlet 23 is not sealed by the diaphragm component 3, the inlet channel 21 and the outlet channel 22 are communicated. When the annular inlet 23 is sealed by the diaphragm component 3, the inlet channel 21 and the outlet channel 22 are communicated.

In this embodiment, the diaphragm component 3 is provided with a pressure boosting hole 33 that communicates the inlet channel 21 and the valve core chamber 24, a bottom of the valve core chamber 24 is provided with a vent hole 241. In an implementation, a cross-sectional area of the vent hole 241 is 3 to 8 times a cross-sectional area of the pressure boosting hole 33.

The controller includes a float 5 and a sealing component 6, the sealing component 6 is linked with the float 5 to seal or open the vent hole 241 when the float 5 in a rising or a falling state.

When the vent hole 241 is in an open state, a pressure inside the valve core chamber 24 quickly equals to an atmospheric pressure. The pressure inside the valve core chamber 24 is lower than a pressure exerted on the diaphragm component by a water pressure of the inlet channel 21. Therefore, the diaphragm component sinks, and the annular inlet 23 is opened, that is, the waterway of the inlet channel 21 and the outlet channel 22 is in a circulating state.

When the sealing component 6 seals the vent hole 241, water vapor in the inlet channel 21 enters the valve core chamber 24 through the pressure boosting hole 33, so that the pressure generated by the valve core chamber 24 on the diaphragm component 3 is balanced with the pressure generated by the water pressure of the inlet channel 21 on the diaphragm component 3, even if a pressure difference between upper and lower parts of the diaphragm component 3 is zero or less than a rebound force of the valve core. At this time, the diaphragm component 3 is lifted upwards by the reset spring 4, thereby sealing the annular inlet 23 and thus miscommunicating the waterway between the inlet channel 21 and the outlet channel 22.

The present disclosure aims at an application field of pet water feeder, and develops an automatic control water valve 1. By using a diaphragm component type valve core, the controller is used to control the sealing or opening of the vent hole 241 at the bottom of the valve core chamber 24, and cooperate with the pressure boosting hole 33 on the diaphragm component 3 to adjust the pressure generated by the valve core chamber 24 on the diaphragm component 3. After the sealing component 6 seals the vent hole 241, the pressure generated by the valve core chamber 24 on the diaphragm component 3 is balanced with the pressure generated by the water pressure of the inlet channel 21 on the diaphragm component 3, thereby the diaphragm component 3 is lifted under an action of the reset spring 4 and the rebound force of the diaphragm silicone rubber. The diaphragm component 3 cooperates with the annular inlet 23 to miscommunicate the waterway between the inlet channel 21 and the outlet channel 22. This automatic control water valve 1 has a small size and compact structure; and the controller is a mechanical automatic control, which is sensitive to water level height. The valve core has strong rebound sealing ability, it can still maintain a good miscommunication effect when the water pressure fluctuates in a tap water pipe 9.

In the embodiment shown in FIGS. 3 to 6, the inlet channel 21 and the outlet channel 22 are oriented from left to right. In an implementation, the inlet channel 21 and the outlet channel 22 (i.e., an approximate direction of the waterway) may be in a right to left direction; it can also be that the inlet channel 21 is downward and the outlet channel is horizontal; at the same time, the overall inlet channel 21 and the outlet channel 22 can be oriented from top to bottom, but there is a bend when passing through the valve core chamber 24 and the annular inlet 23, which allows the valve core chamber 24 to play a role of communicating or miscommunicating the waterway.

Figure 1:
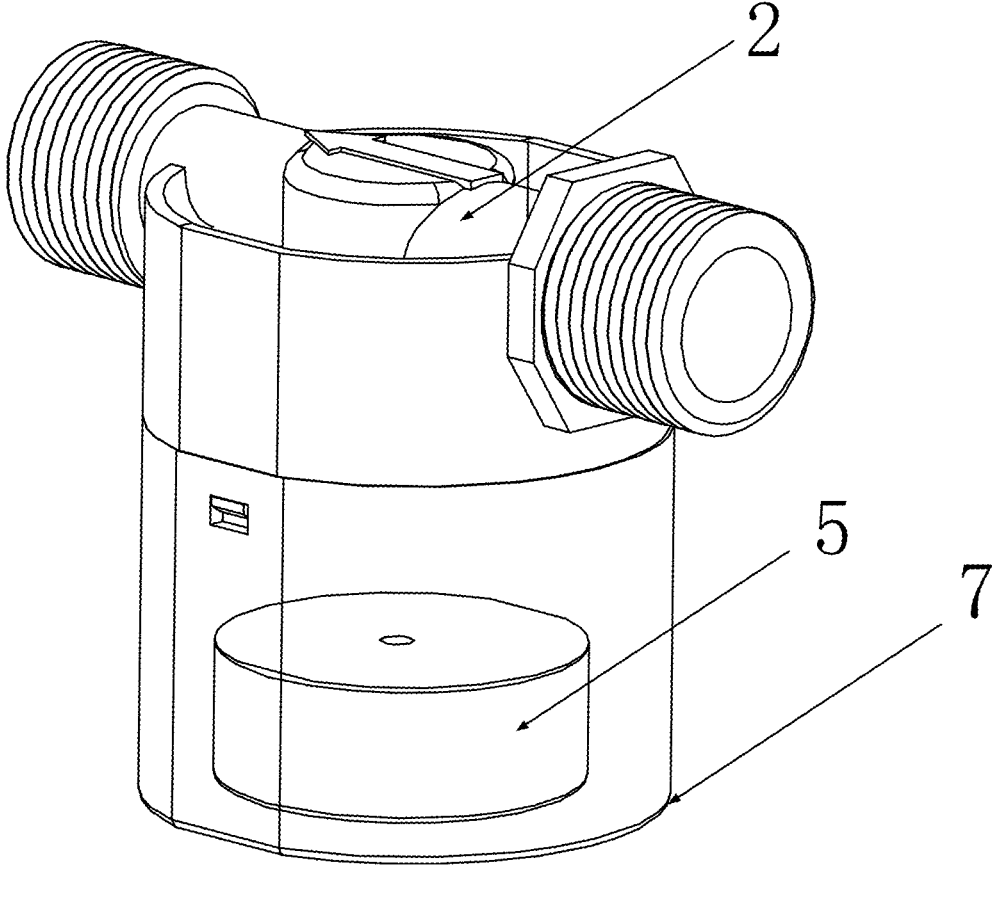
FIG. 1 is a schematic structural diagram of an automatic control water valve in an embodiment of the present disclosure.
Figure 2:
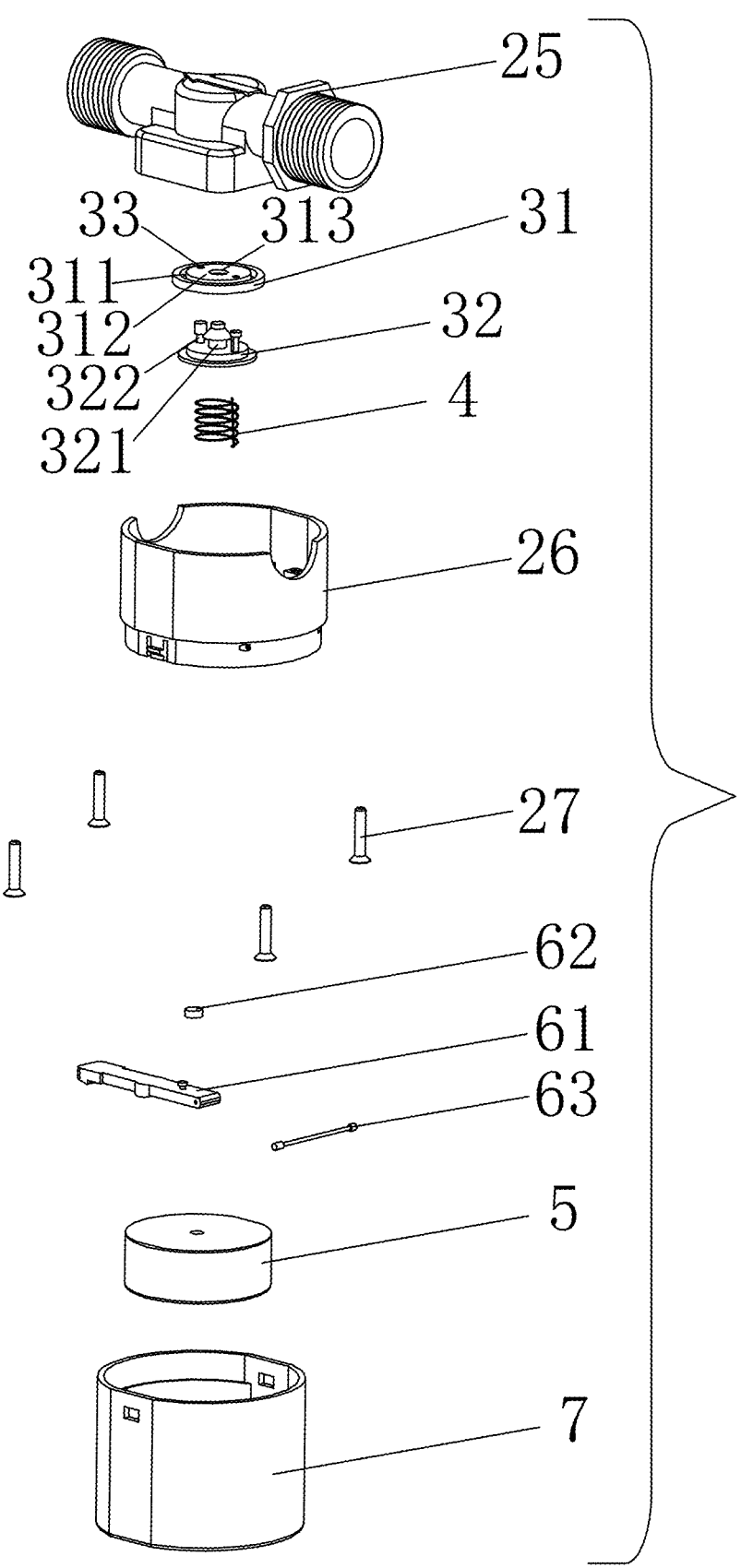
FIG. 2 is a schematic diagram of an explosive structure of FIG. 1.
Figure 6:
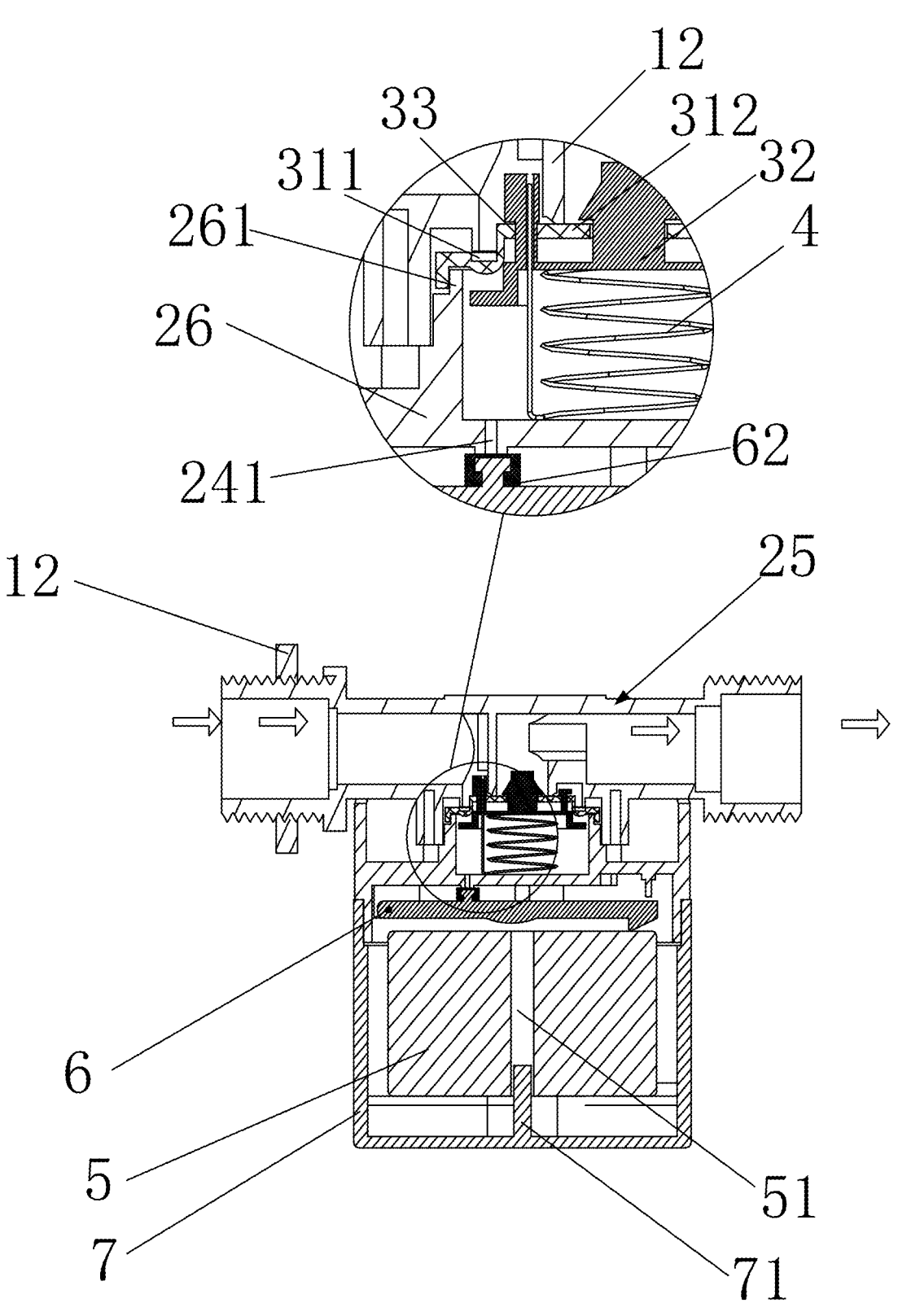
FIG. 6 is a partial schematic diagram of FIG. 5.
Figure 7:
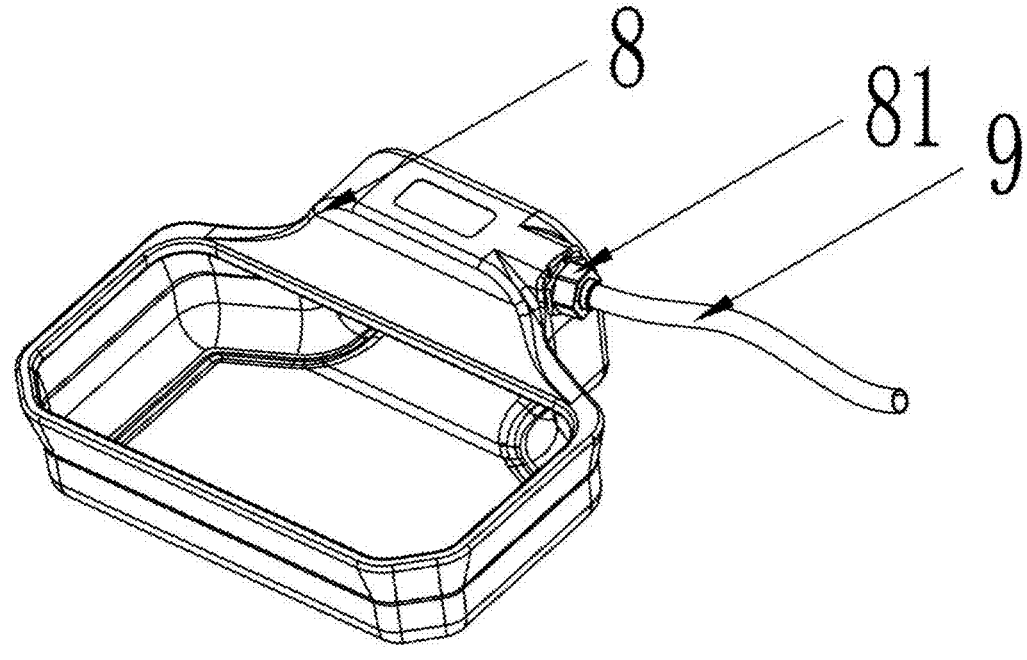
FIG. 7 is a schematic structural diagram of an automatic water feeder in an embodiment of the present disclosure.
Figure 8:
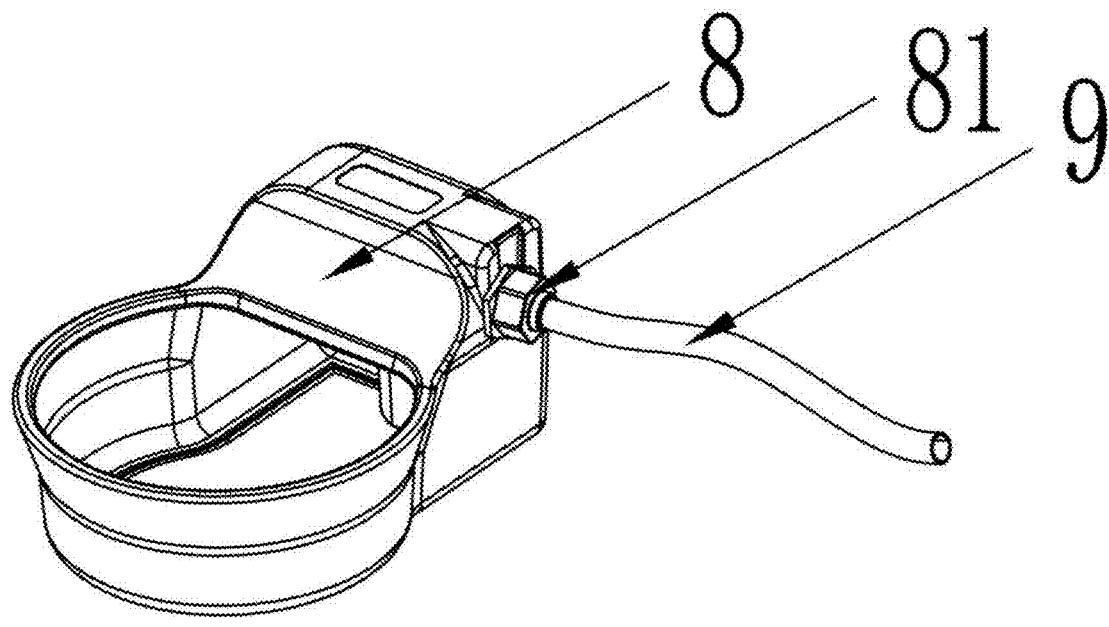
FIG. 8 is a schematic structural diagram of the automatic water feeder in another embodiment of the present disclosure.
Figure 9:
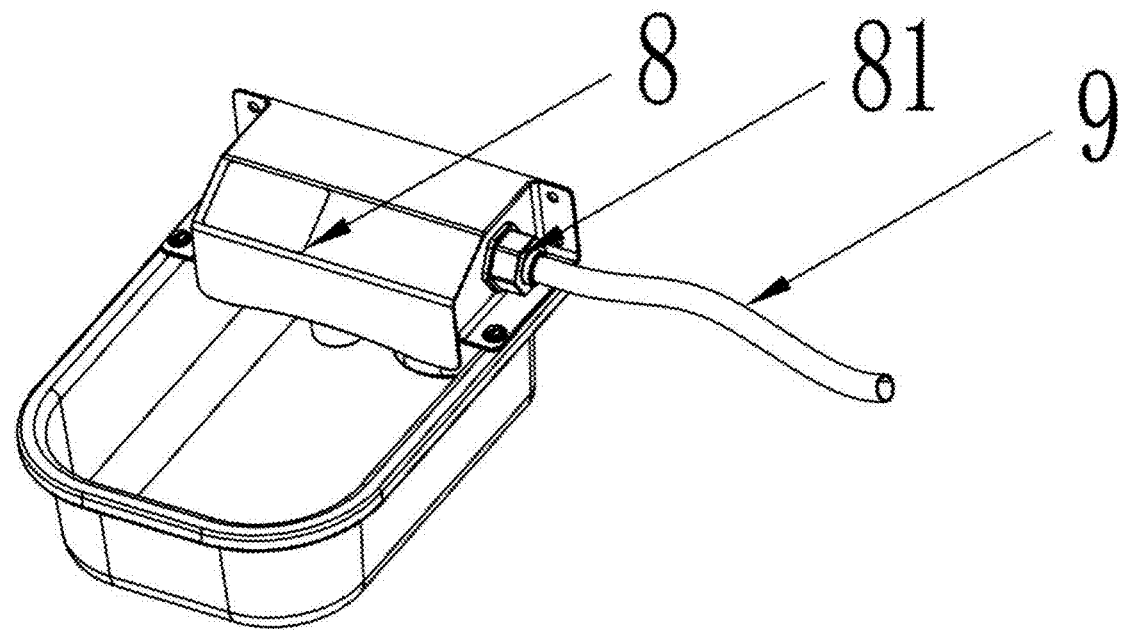
FIG. 9 is a schematic structural diagram of the automatic water feeder in still one embodiment of the present disclosure.
Figure 10:
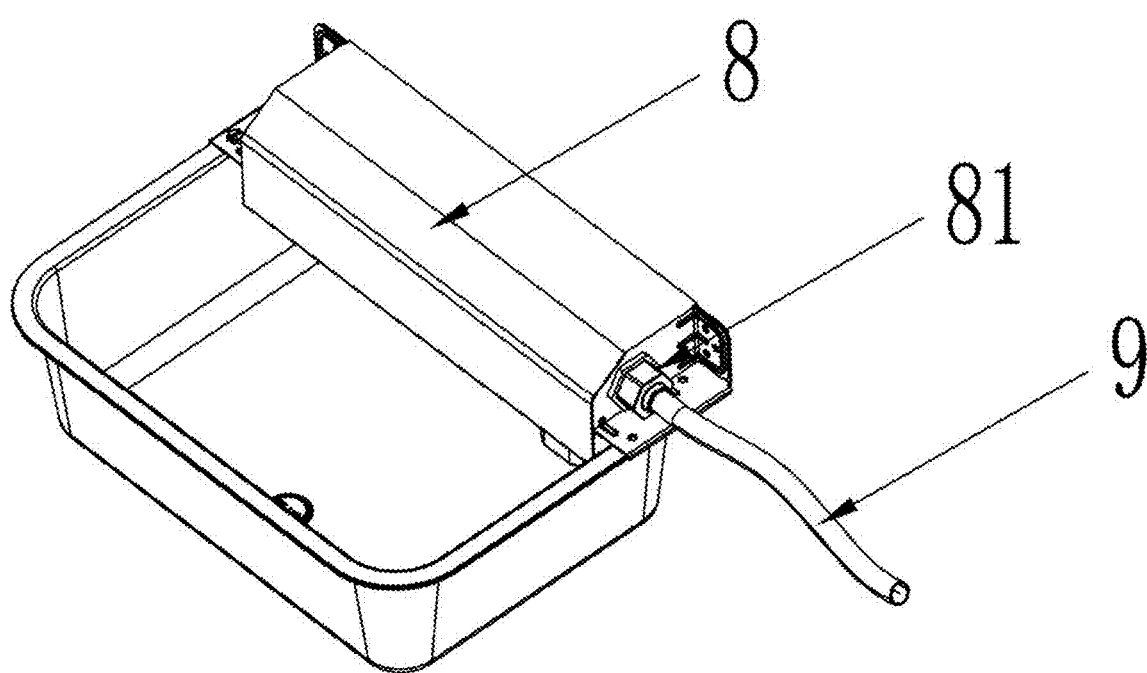
FIG. 10 is a schematic structural diagram of the automatic water feeder in yet one embodiment of the present disclosure.

Please refer to FIGS. 1 and 6. The diaphragm component 3 includes a diaphragm silicone 31 and a silicone fastener 32. The diaphragm silicone 31 is provided on an upper of the silicone fastener 32, a bottom of the silicone fixing piece 32 is connected to the reset spring 4. The diaphragm silicone 31 is provided with a central hole 313 and the pressure boosting hole 33, the silicone fastener 32 is provided with a central column 321 and a side column 322; the central column 321 passes through the central hole 313, and the side column 322 passes through the pressure boosting hole 33.

Figure 4:
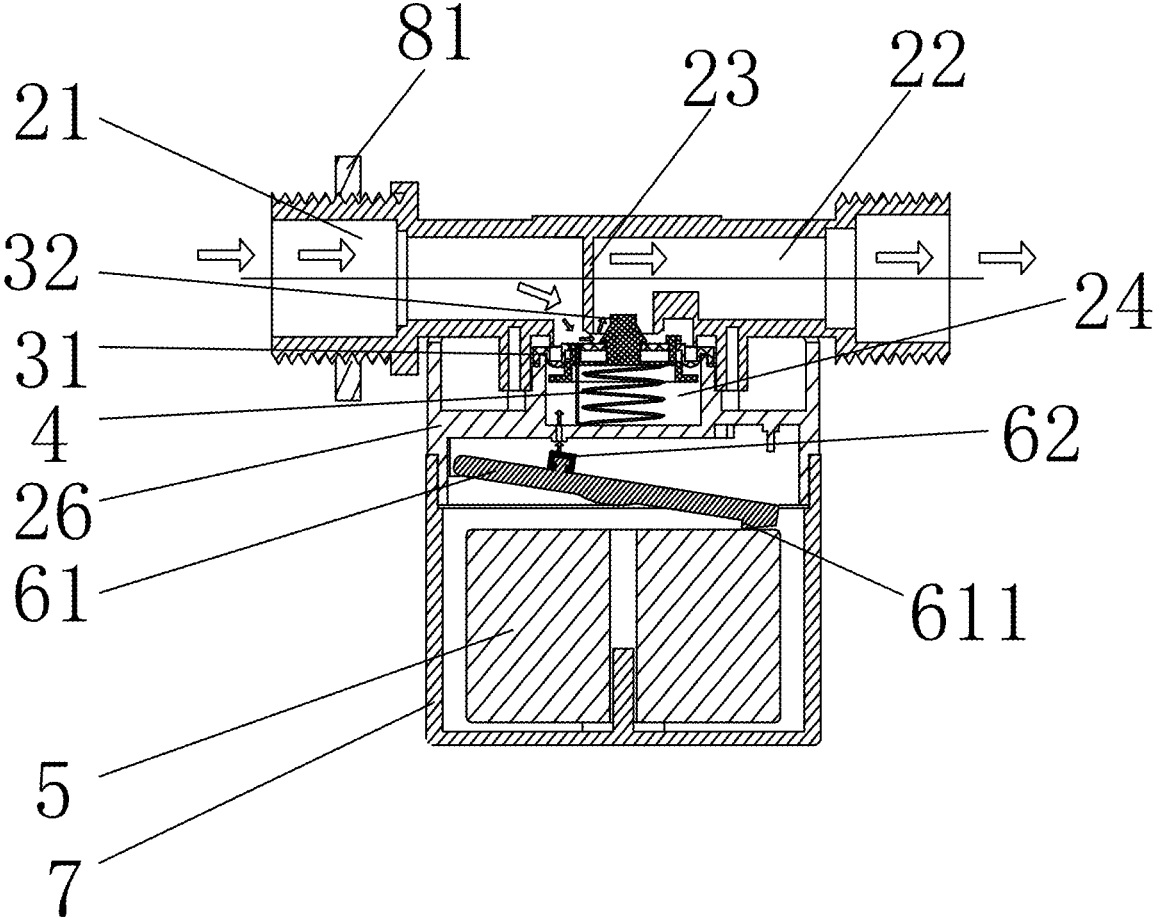
FIG. 4 is a partial state schematic diagram of FIG. 3.

Please refer to FIGS. 4 and 6. In order to further enhance a water locking effect of the valve core, an outer periphery of the diaphragm silicone 31 is provided with a sealing upper concave ring 311. In this embodiment, the sealing upper concave ring 311 is located at the outermost or outermost periphery of the diaphragm silicone 31; a top of a side wall of the valve core chamber is provided with an upper convex circular ring 261 that is compatible with the sealing upper concave ring 311.

An inner or inner ring of the sealing upper concave ring 311 is provided with a rebound lower concave ring 312, which is a ring-shaped groove that is concave towards a bottom of the valve core chamber. Please refer to FIG. 6, a form of the silicone diaphragm of the automatic control water valve in a closed state is in its initial state. The rebound lower concave ring 312 can render the diaphragm silicone 31 is tilted or sank along a groove of the rebound lower concave ring 312 when the diaphragm component 3 is subjected to a water pressure in a water inlet direction. After the float 5 rises with the water level and controls the vent hole 241 to be closed, the rebound lower concave ring 312 can provide a large rebound tension. By a cooperation of the diaphragm silicone 31 with elastic silicone material and a structure of the rebound lower concave ring 312 with strong rebound tension, the rebound force of the valve core is stronger. When the sealing component 6 seals the vent hole 241, the pressure difference between the pressure generated by the valve core chamber 24 on the diaphragm component 3 and the pressure generated by the water pressure of the inlet channel 21 on the diaphragm component 3 is relatively large. Only a force smaller that the rebound force of the diaphragm silicone 31 and the reset spring 4 is needed to rebound and seal the annular inlet 23, thereby cutting off the waterway.

In this embodiment, the valve body 2 includes an upper shell 25 and a lower shell 26. The upper shell 25 includes the inlet channel 21, the outlet channel 22, and the annular inlet 23 of the outlet channel 22. The lower shell 26 includes the valve core chamber. A structure design that the lower shell 26 is detachably or fixedly connected to the upper shell 25 facilitates a production of the valve body, and a detachable fixed connection structure facilitates the cleaning of the valve core and further maintains the sealing effect. In this embodiment, the upper shell 25 and the lower shell 26 are threaded fixed by four screws 27. In an implementation, other detachable fixed connection ways can also be used.

Please refer to FIGS. 3 to 6. The sealing component 6 includes a valve clack connection rod 61 and a sealing block 62. One end of the valve clack connection rod 61 is hinged to the lower shell 26 of the valve body 2 through a pin 63, and the other end of the valve clack connection rod 61 abuts against the float 5 to move up and down with the float 5. The sealing block 62 is provided on the valve clack connection rod 61 and corresponds to a position of the vent hole 241.

Please refer to FIGS. 3 to 6. When the water level in the application scenario reaches a set water level, the float 5 automatically closes the sealing block 62 on the valve clack connection rod 61 and the vent hole 241 under buoyancy and forms a closed state of the valve core chamber without a water outlet hole. The pressure generated by the valve core chamber 24 on the diaphragm component 3 is equal to the pressure generated by the water pressure of the inlet channel 21 on the diaphragm component 3. The diaphragm component 3 is lifted up by the reset spring 4 to seal the annular inlet 23, thereby achieving the effect of sealing the outlet channel 22 and miscommunicating the waterway. When the water level in the application scenario is lower than the set water level, the float 5 sinks downward under its own gravity, the valve clack connection rod 61 falls freely, the vent hole 241 opens, liquid and gas in the valve core chamber 24 flow away from the vent hole 241. Therefore, the pressure generated by the valve core chamber 24 on the diaphragm component 3 is less than the pressure generated by the water pressure of the inlet channel 21 on the diaphragm component 3. The diaphragm component 3 descends and the outlet channel 22 is opened.

In this embodiment, the sealing block 62 is made of silicone material, which can improve the sealing performance.

In an implementation, the sealing block 62 is provided at a position near the hinge of the valve clack connection rod 61. In an implementation, a length of the valve clack connection rod 61 is defined as L, and the sealing block 62 is located at a position with a distance of $\frac{1}{5}$L to $\frac{1}{3}$L from the hinge. From FIG. 4, it can be seen that in this embodiment, the valve clack connection rod 61 is provided with the pin 63 at a left end, and abuts against the float 5 on a right side. The angular relationship is formed, which conforms to the principle of lever force. Therefore, according to the principle of lever, the sealing block 62 is provided near the hinge position of the valve clack connection rod 61, which can render the sealing force of the sealing block 62 on the valve clack connection rod 61 against the vent hole 241 greater, so that the sealing force can completely offset a pressure applied to the sealing block 62 through the vent hole 241 in the valve core chamber 24.

In an implementation, a protrusion 611 facing a direction of the float 5 is provided at a position that the valve clack connection rod 61 abuts against the float 5, so that in a sealing state, the valve clack connection rod 61 is parallel to the bottom of the valve core chamber 24, that is, the sealing block 62 is parallel to a lower end surface of the vent hole 241, so as to improve the effect of the float 5 lifting the valve clack connection rod 61 and enhance the sealing performance between the sealing block 62 and the vent hole 241.

In an implementation, a filter screen is provided at a bottom of the valve core chamber 24, and a mesh diameter of the filter screen is smaller than that of the vent hole 241. When the sealing block 62 on the valve clack connection rod 61 and the vent hole 241 are opened, the filter screen can play a role that a pressure relief of the valve core chamber 24 is more balanced.

Please refer to FIGS. 1 to 6. The automatic control water valve 1 further includes a float bowl 7, which is fixedly connected to the valve body 2. The float bowl 7 is provided with a vertical guide rod 71, the float 5 is located in the float bowl 7 and has a vertical guide groove 51 that slides and adapts to the vertical guide rod 71. The float bowl 7 is provided with an inlet, which is generally located at a bottom or lower wall of the float bowl 7. In application scenarios such as when the liquid level of a pet water feeder changes, the float 5 can move freely up and down in the float bowl 7. The float bowl 7 and the valve body 2 can be disassembled for easy cleaning and maintenance.

Please refer to FIGS. 3 to 7. The present application further provides an embodiment of an automatic water feeder, including a water feeding container 8, a valve fixing nut 81, and the automatic control water valve 1 as described above. An outer wall of the inlet channel 21 of the valve body 2 is provided with an external threaded part, a side wall of the water feeding container 8 is provided with an installation through-hole. The valve fixing nut 81 is configured to be threaded fixed with the valve body 2 when one side of the inlet channel 21 of the valve body 2 passes through the installation through-hole, a tap water pipe 9 is fixedly connected to the inlet channel 21 of the valve body 2.

Figure 3:
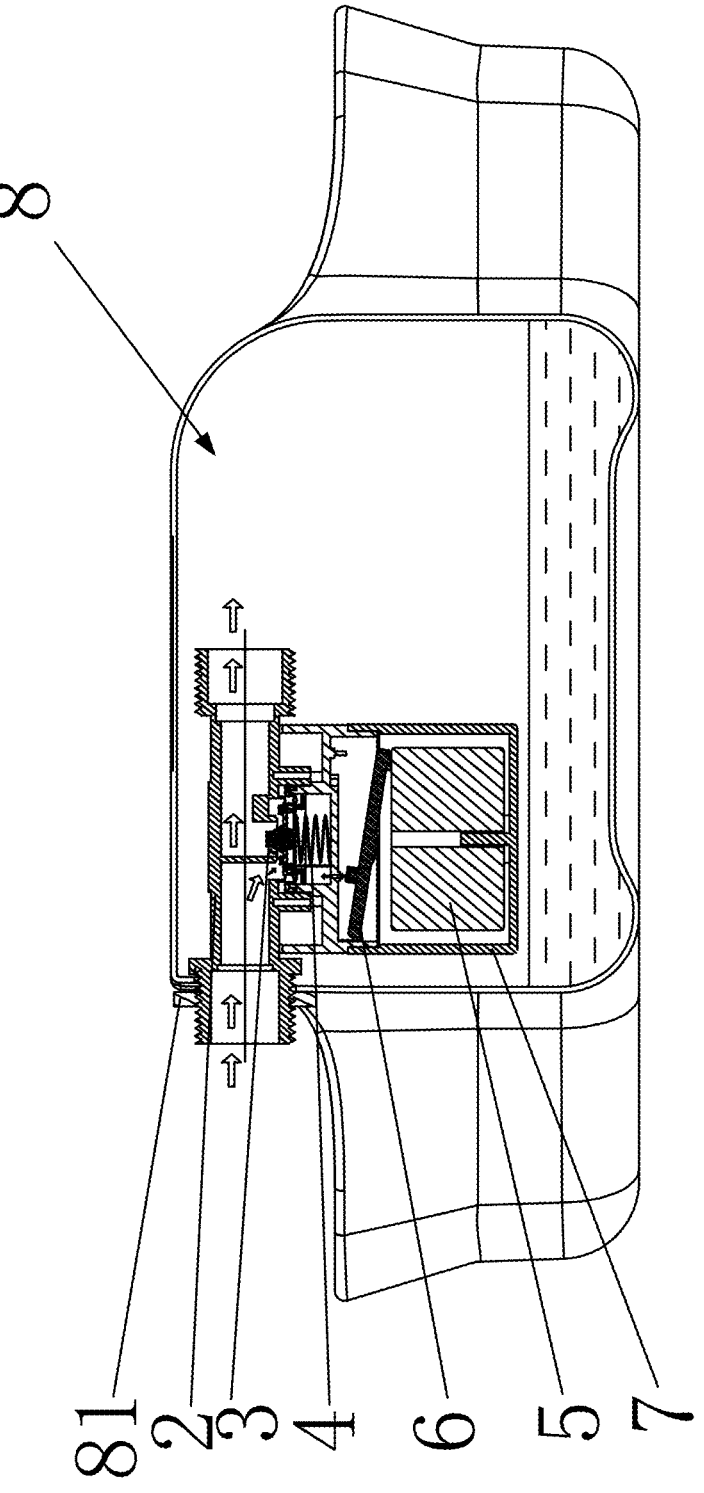
FIG. 3 is a schematic diagram of a working principle of the automatic control water valve in an open state of FIG. 1.

Please refer to FIGS. 3 and 4. The automatic control water valve 1 is installed at an inner side of the water feeding container 8, there is a hole at a bottom of the float bowl 7 that can be communicated to the water in the water feeding container 8. When the water level in the water feeding container 8 drops, the float 5 comes into contact with a water surface in the float bowl 7. When the water in the water feeding container 8 is lower than the set water level, the float 5 sinks together with the water level under its own gravity. One end of the valve clack connection rod 61 freely descends with the float 5, the sealing block 62 installed on the valve clack connection rod 61 is caused to open with the vent hole 241. The valve core chamber 24 is no longer sealed, and an internal pressure of the valve core chamber 24 is only equal to the atmospheric pressure. Under the pressure of tap water, the diaphragm component 3 is forced to open, and tap water enters an interior of the container 11, thereby achieving automatic water entering.

Figure 5:
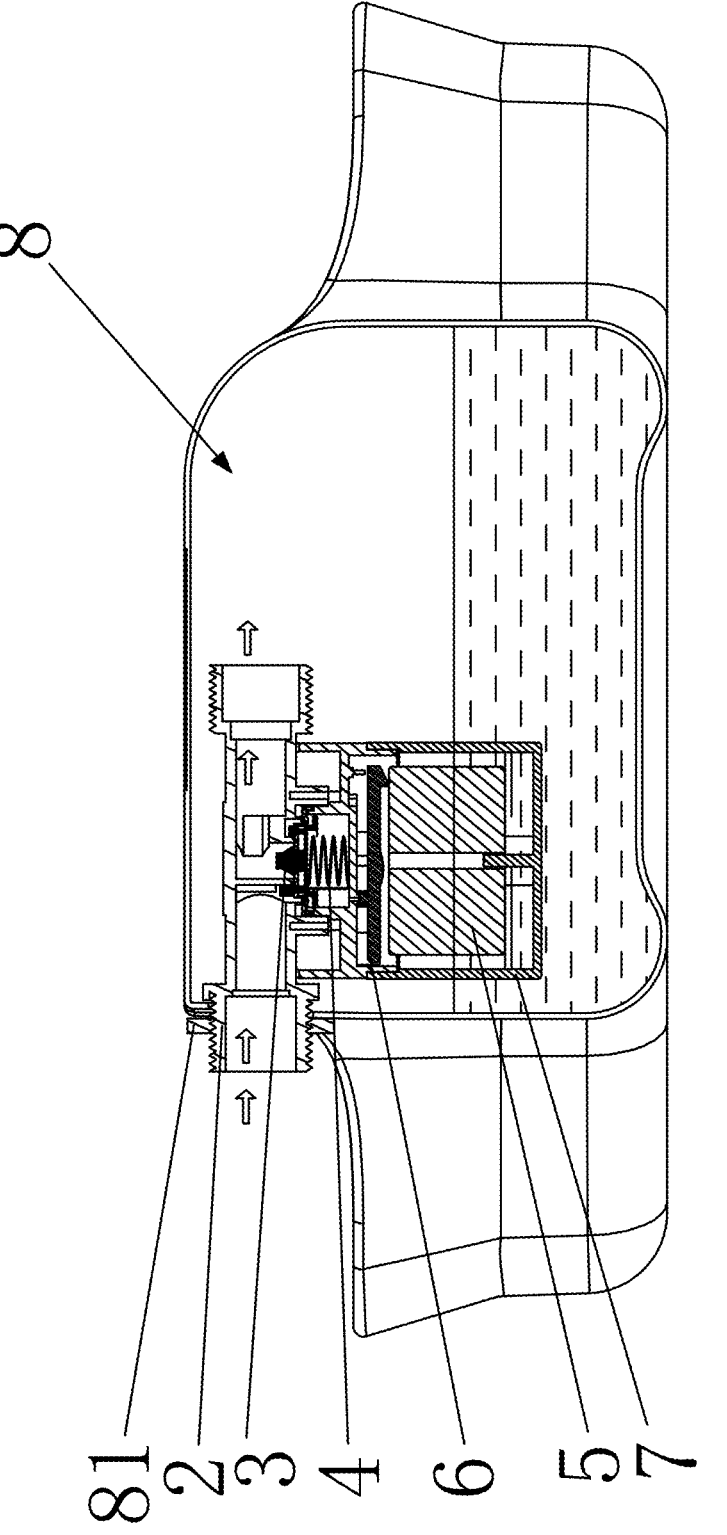
FIG. 5 is a schematic diagram of a working principle of the automatic control water valve in a closed state of FIG. 1.

Please refer to FIGS. 5 and 6. When the water level in the water feeding container 8 rises, the float 5 contacts the water surface in the float bowl 7. The float 5 floats horizontally upward together with the buoyancy of the water in the float bowl 7. When the water in the water feeding container 8 reaches the set water level, the valve clack connection rod 61 swings freely upward. The sealing block 62 on the valve clack connection rod 61 seals and closes the vent hole 241. The pressure in the valve core chamber 24 rises to be close to or the same as the tap water pressure. Under the action of the reset spring 4, the diaphragm component 3 and the annular inlet 23 automatically close and cut off the water-way.

The automatic water feeder can be placed on the ground or hung for convenient use. In an implementation, the water feeding container is provided with a hanging component, which is configured to hang the water feeding container on a wall, or the hanging component can hang the water feeding container on a fixed bracket for easy use by a pet.

Please refer to FIGS. 7 to 10. A water filling part of the water feeding container can be in a shape of circular basin, rectangular basin, or irregular basin, and there are no restrictions on this.

The above are only preferred embodiments of the present disclosure, and the protection scope of the present disclosure is not limited to the above embodiments. Any technical solution belonging to the inventive concept is within the protection scope of the present disclosure.

What is claimed is:

1. An automatic control water valve, comprising:
   a valve body, comprising an inlet channel, an outlet channel, and a valve core chamber located below the inlet channel and the outlet channel, wherein the outlet channel has an annular inlet with an opening facing the valve core chamber;
   a valve core, provided in the valve core chamber and comprising a diaphragm component and a reset spring; the diaphragm component is configured to cooperate with the annular inlet to communicate or miscommunicate a waterway between the inlet channel and the outlet channel;
   the diaphragm component is provided with a pressure boosting hole communicating the inlet channel and the valve core chamber, a bottom of the valve core chamber is provided with a vent hole;
   a controller, comprising a float and a sealing component, wherein the sealing component is linked with the float to seal or open the vent hole in rising or falling state of the float, the reset spring is configured to lift the diaphragm component to miscommunicate the water-way between the inlet channel and outlet channel after the sealing component seals the vent hole;
   wherein the diaphragm component comprises a silicone diaphragm and a silicone fastener, the silicone diaphragm is provided with a central hole and the pressure boosting hole, the silicone fastener is provided with a central column and a side column; the central column passes through the central hole, and the side column passes through the pressure boosting hole.

2. The automatic control water valve according to claim 1, wherein the sealing component comprises a valve clack connection rod and a sealing block; one end of the valve clack connection rod is hinged on the valve body, an other end of the valve clack connection rod abuts against the float to move up and down with the float; the sealing block is provided on the valve clack connection rod and corresponds to the vent hole.

3. The automatic control water valve according to claim 2, wherein the valve clack connection rod is provided with a protrusion configured to abut against the float; the sealing block is located between a hinged end of the valve clack connection rod and the protrusion.

4. The automatic control water valve according to claim 2, wherein the sealing block is provided at a position near a hinge of the valve clack connection rod.

5. The automatic control water valve according to claim 4, wherein a length of the valve clack connection rod is defined as L, and the sealing block is located at a position with a distance of ⅕L to ⅓L from the hinge.

6. The automatic control water valve according to claim 1, wherein the silicone diaphragm is provided on an upper portion of the silicone fastener, a bottom of the silicone fastener is connected to one end of the reset spring, an other end of the reset spring is connected in the side column.

7. The automatic control water valve according to claim 6, wherein an outer periphery of the silicone diaphragm is provided with a sealing upper concave ring, which is provided on a top of a side wall of the valve core chamber, an inner side of the sealing upper concave ring is provided with a rebound lower concave ring.

8. The automatic control water valve according to claim 7, wherein the valve body comprises an upper shell and a lower shell, the upper shell comprises the inlet channel and the outlet channel; the lower shell comprises the valve core chamber; the lower shell is detachably or fixedly connected to the upper shell.

9. The automatic control water valve according to claim 1, further comprising a float bowl, wherein the float bowl is detachably or fixedly connected to the valve body; the float moves vertically up and down on the float bowl.

10. The automatic control water valve according to claim 9, wherein the float bowl is provided with a vertical guide rod, the float is located in the float bowl and has a vertical guide groove, the vertical guide rod slides in the vertical guide groove.

11. An automatic water feeder, comprising a water feeding container, a valve fixing nut, and the automatic control water valve according to claim 1; wherein an outer wall of the inlet channel of the valve body is provided with an external threaded part, a side wall of the water feeding container is provided with an installation through-hole; the valve fixing nut is configured to be threadedly fixed with the valve body when one side of the inlet channel of the valve body passes through the installation through-hole.

12. The automatic water feeder according to claim 11, wherein a water filling part of the water feeding container is in a shape of circular basin, rectangular basin, or irregular basin.

13. The automatic control water valve according to claim 1, wherein a cross-sectional area of the vent hole is 3 to 8 times a cross-sectional area of the pressure boosting hole.

* * * * *